United States Patent
Prabhu

(10) Patent No.: US 10,068,065 B2
(45) Date of Patent: Sep. 4, 2018

(54) ASSIGNMENT OF A MACHINE-READABLE LINK TO CONTENT AS A PAYOFF

(71) Applicants: HEWLETT-PACKARD DEVELOPMENT COMPANY, L.P., Houston, TX (US); Sandeep Matti Prabhu, Bangalore (IN)

(72) Inventor: Sandeep Matti Prabhu, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 201 days.

(21) Appl. No.: 15/122,334

(22) PCT Filed: Mar. 4, 2014

(86) PCT No.: PCT/IN2014/000142
§ 371 (c)(1),
(2) Date: Aug. 29, 2016

(87) PCT Pub. No.: WO2015/132793
PCT Pub. Date: Sep. 11, 2015

(65) Prior Publication Data
US 2016/0371470 A1    Dec. 22, 2016

(51) Int. Cl.
*G06F 21/10* (2013.01)
*G06K 7/00* (2006.01)
(Continued)

(52) U.S. Cl.
CPC .......... *G06F 21/10* (2013.01); *G06F 21/6218* (2013.01); *G06K 7/00* (2013.01);
(Continued)

(58) Field of Classification Search
None
See application file for complete search history.

(56) References Cited

U.S. PATENT DOCUMENTS 6,975,419 B2    12/2005    Staas et al.
7,039,214 B2    5/2006    Miller et al.
(Continued)

FOREIGN PATENT DOCUMENTS

CN    1012022489 A    8/2007
CN    203313206 U    11/2013
(Continued)

OTHER PUBLICATIONS

"Fuji Xerox Launches Skydesk Media Switch, a Cloud1 Software-as-a-service Linking Print Materials to Digital Media, in Asia Pacific," Nov. 7, 2013, http://www.fujixerox.com.hk 2 pages.
(Continued)

*Primary Examiner* — William J. Goodchild
(74) *Attorney, Agent, or Firm* — HP Inc. Patent Department

(57) ABSTRACT

Examples disclosed herein relate to assignment of a machine-readable link to content as a payoff. Examples include acquisition of an email message specifying an external link identifier, and identification of a machine-readable link to which the external link identifier is assigned in a linking service. Examples further include, based on the email message, a linking platform being caused to assign the machine-readable link to content as the payoff for the machine-readable link.

15 Claims, 3 Drawing Sheets

(51) Int. Cl.
  *G06Q 10/00* (2012.01)
  *H04L 29/08* (2006.01)
  *G06F 21/62* (2013.01)
  *H04L 29/06* (2006.01)
  *H04W 12/06* (2009.01)

(52) U.S. Cl.
  CPC .............. *G06Q 10/00* (2013.01); *H04L 67/02* (2013.01); *H04L 63/18* (2013.01); *H04W 12/06* (2013.01)

(56) References Cited

U.S. PATENT DOCUMENTS

| | | | |
|---|---|---|---|
| 7,640,209 B1* | 12/2009 | Brooks | G06Q 40/025 705/38 |
| 7,830,535 B2 | 11/2010 | Komatsubara | |
| 8,286,068 B2 | 10/2012 | Brush et al. | |
| 8,494,838 B2 | 7/2013 | Donabedian et al. | |
| 2012/0045089 A1 | 2/2012 | Ramos et al. | |
| 2012/0234907 A1 | 9/2012 | Clark et al. | |
| 2012/0250076 A1 | 10/2012 | Kumar et al. | |
| 2012/0284602 A1 | 11/2012 | Seed et al. | |
| 2013/0037606 A1 | 2/2013 | Murdoch | |
| 2014/0025512 A1 | 1/2014 | Armstrong et al. | |
| 2016/0267584 A1* | 9/2016 | Nair | G06Q 40/025 |

FOREIGN PATENT DOCUMENTS

| | | |
|---|---|---|
| EP | 2278497 A2 | 1/2011 |
| WO | WO-2013019742 | 2/2013 |
| WO | WO-2013056340 | 4/2013 |

OTHER PUBLICATIONS

AWinware Pdf Watermark 1.0.1.3, (Web Page), Dec. 7, 2012~http://www.freedownloadscenter.com/~2 pages.

Digimarc, "Online Embedding—Create Your Own Interactive Materials," Feb. 10, 2014, <http://www.digimarc.com/~2 pages.

Free Downloads Center, "AWinware Pdf Watermark 1.0.1.3," (Web Page), Dec. 7, 2012, <http://www.freedownloadscenter.com/~2 pages.

Girgensohn, A. et al., "A Tool for Authoring Unambiguous Links From Printed Content to Digital Media," Proc of 19th ACM Int'l Conf on Multimedia~Nov. 2011, pp. 1561-1564.

Hodgekiss, "Plan to scan: QR codes and HTML email," Campaign Monitor, Jun. 11, 2012, <http://www.campaignmonitor.com/~4 pages.

HP Autonomy, "Aurasma Partner Guidelines: A comprehensive guide to Aurasma," Feb. 10, 2014~http://www-cdn.aurasma.com/~37 pages.

Kaywa, "Free QR Code Generator, Coupon, Contact & Design QR Codes & Tracking," Feb. 10, 2014, <http://qrcode.kaywa.com>, 1 page.

Wikipedia, "Barcode," Feb. 27, 2014, <http://en.wikipedia.org/wiki/Barcode>~21 pages.

Wikipedia, "QR code," Jan. 25, 2014. <http://en.wikipedia.org/wiki/Qr_code>~17 pages.

Wikipedia, "Vine (software)," Mar. 6, 2014, <http://en.wikipedia.org/wiki/Vine_(software)>~4 pages.

* cited by examiner

US 10,068,065 B2

ASSIGNMENT OF A MACHINE-READABLE LINK TO CONTENT AS A PAYOFF

BACKGROUND

Various types of machine-readable links, such as one- or two-dimensional barcodes, digital watermarks, images, and the like, may be optically readable by a computing device with an image capture device. Such machine-readable links may be encoded or associated with various types of information. In some examples, a machine-readable link may be encoded or associated with information identifying content accessible over a computer network.

BRIEF DESCRIPTION OF THE DRAWINGS

The following detailed description references the drawings, wherein.

DETAILED DESCRIPTION

Figure 1:
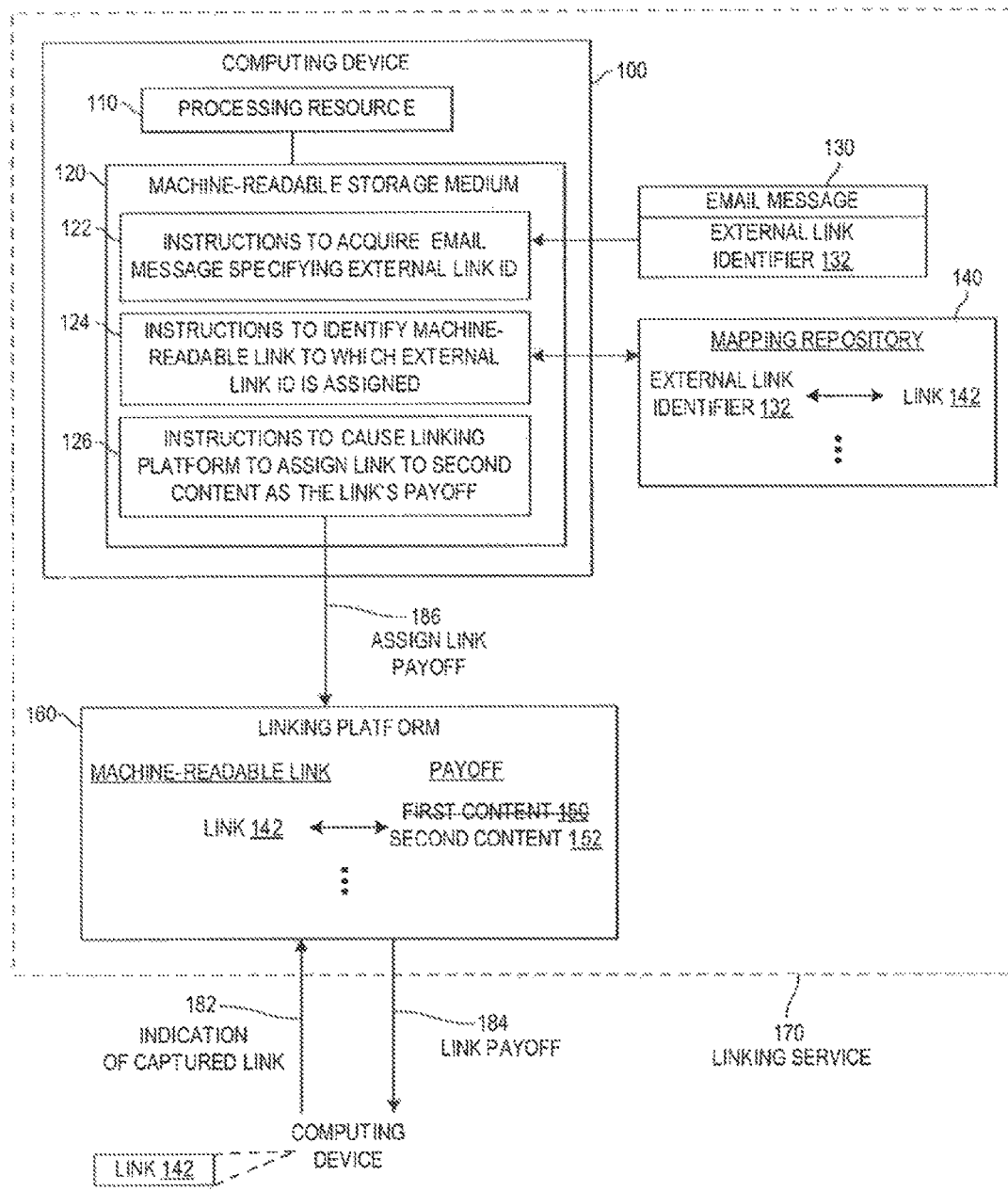
FIG. 1 is a block diagram of an example linking service to assign a machine-readable link to content as a payoff.

As noted above, a machine-readable link may be encoded or associated with information identifying content accessible over a computer network. For example, a computing device having an image capture device (e.g., a digital camera, or the like) may capture the machine-readable link and then communicate with a linking service to access content (e.g., a video, a website, etc.) associated with the machine-readable link by the linking service.

A link creator may utilize such a linking service to create a given machine-readable link and associate it with desired content. In some examples, a link creator may register to access a developer portal (or other developer user interface) established for the linking service, sign in to the developer portal, and then use an established creation workflow to create the machine-readable link and associate it with the desired content. In such examples, updating a link to be associated with different content may also involve singing into the developer portal, searching for the machine-readable link to be updated, and then using a link updating workflow to update the content associated with the link.

However, it may be inconvenient to utilize this update process for every link update operation, especially if a user other than the original link creator desires to update the link. For example, for another user to update may involve the other user creating an account or using a shared account for the developer portal, signing in to the portal, searching for the appropriate link, and then utilizing the portal's update workflow. This may be especially difficult for users that are not technically savvy, not experienced with the developer portal, or the like. For example, a machine-readable link created by developer may be utilized by a teacher in instructional materials. Should the teacher wish to update the content associated with the link, the above process may be especially cumbersome if the teacher is not familiar with the developer portal or not technically savvy.

To address these issues, in examples described herein, external link identifiers may be assigned to respective machine-readable links of a linking service, and the content associated with a particular link may be updated by sending an email, including the external link identifier for the link, to the linking service. In some examples, a linking service may acquire an email message specifying an external link identifier and identify a machine-readable link to which the acquired external link identifier is assigned in a mapping repository of the linking service. In some examples, the machine-readable link may be associated with first content prior to the email. In some examples, based on the email message and the identification, the linking service may cause a linking platform of the linking service to assign the machine-readable link to second content, different than the first content, as the payoff for the machine-readable link. In some examples, the external link identifier may be a dedicated email address assigned to the machine-readable link, and sending an email to the linking service to update the link may include sending the email to the email address assigned to the machine-readable link.

In this manner, examples described herein may enable a user to update the content associated with a machine-readable link (e.g., the payoff for the link) by sending an email. Such examples may provide a more user-friendly way to update a machine-readable link using an email client, for example, rather than a developer portal.

Referring now to the drawings, FIG. 1 is a block diagram of an example linking service 170 to assign a machine-readable link 142 to content as a payoff. In the example of FIG. 1, linking service 170 includes a computing device 100, a mapping repository 140, and a linking platform 160.

In examples described herein, a "machine-readable link" may be an image associated with a linking service that is optically readable by a computing device, using an image capture device (e.g., a digital camera, etc.), to determine payload information with which the computing device may obtain access to content assigned to the image in the linking service. A machine-readable link may comprise at least one of a bar code (e.g., a one-dimensional bar code, two-dimensional bar code, matrix bar code, QUICK RESPONSE CODE (QR CODE), or the like), a digital watermark, a target image such as a printed photograph, or the like. In some examples, a machine-readable link, such as a bar code, may comprise the payload information encoded or embedded therein. In some examples, a machine-readable link such as digital watermark may comprise the payload information encoded or embedded in a carrier image. In other examples, a target image may not contain encoded or embedded payload information. In such examples, a computing device using an image capture device may determine the payload information based on features, characteristics, or other aspects of the target image itself, or the like, or a combination thereof.

In examples described herein, "content" may be any suitable type or information that may be accessed (e.g., retrieved, viewed, etc.) over a computer network, such as a digital video, a website or webpage, a uniform resource identifier (URI) (such as a uniform resource locator (URL)) for web content (e.g., a website), or the like. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network).

In examples described herein, a "linking service" may be a service implemented by one or more networked computing devices to create and manage machine-readable links, and to create and manage the assignment of content to respective machine-readable links. In some examples, a linking service may comprise a "linking platform", which may be a system implemented by one or more networked computing devices to perform functions of the linking service, including assigning content to respective machine-readable links and providing a computing device access to the content assigned to a given machine-readable link in response to an indication that the computing device has captured an image of the given machine-readable link. In examples described herein, the content assigned to a particular machine-readable link by a linking service may be referred to as a "payoff" of the machine-readable link.

In the example of FIG. 1, machine-readable link 142 may initially be assigned to first content 150 as the payoff for machine-readable link 142 by linking platform 180. Though machine-readable link 142 is schematically illustrated in FIG. 1 as being assigned to content by linking platform 160, in some examples linking platform 160 may implement this assignment by assigning an internal link identifier for machine-readable link 142 to the content. In examples described herein, an "internal link identifier" may be an identifier used within a linking platform (such as linking platform 160) to identify respective machine-readable links. In some examples, linking platform 160 may comprise at least one machine-readable storage medium, database, or the like, or a combination thereof, to implement the assignment of links to content. Although one assignment of a link to content (payoff) is illustrated in FIG. 1, in some examples, linking platform may comprise assignments of a plurality of machine-readable links to respective content (payoffs).

In the example of FIG. 1, a computing device remote from linking service 170 may capture an image of machine-readable link 142 (e.g., displayed somewhere remote from linking service 170, printed on paper or another physical medium, etc.) and determine payload information for link 142, as described above. In such examples, the computing device may provide an indication 182 that the computing device has captured an image of machine-readable link 142. In some examples, the indication 182 may comprise the payload information determined from link 142. In response to indication 182, linking platform 160 linking platform 160 may determine the content assigned to link 142, which in the example of FIG. 1 is initially first content 150, and may provide the computing device access to first content 150 as a payoff 184 for machine-readable link 142. In examples described herein, linking platform 160 may provide access to content by providing a copy of the content (e.g., a digital video file), by enabling computing device to access a remote copy of the content (e.g., a digital video file stored remotely), by directing (or redirecting) the computing device to access the content (e.g., directing computing device to access a URL), or in any other suitable manner.

Examples of updating content assigned to a machine-readable link are described below in relation to FIG. 1. In the example of FIG. 1, computing device 100 includes a processing resource 110 and a machine-readable storage medium 120 comprising (e.g., encoded with) instructions 122, 124, and 126 executable by processing resource 110. In some examples, storage medium 120 may include additional instructions. In some examples, instructions 122, 124, and 126, and any other instructions described herein in relation to storage medium 120, may be stored on a machine-readable storage medium remote from but accessible to computing device 100 and processing resource 110 (e.g., via a computer network). In some examples, instructions 122, 124, and 126 may be instructions of a computer program, computer application ("app"), agent, or the like, of computing device 100. In other examples, the functionalities described herein in relation to instructions 122, 124, and 126 may be implemented as engines comprising any combination of hardware and programming to implement the functionalities of the engines, as described below.

As used herein, a "computing device" may be a desktop computer, laptop (or notebook) computer, workstation, tablet computer, mobile phone, smart device, server, blade enclosure, or any other processing device or equipment. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 1, instructions 122 may actively acquire (e.g., retrieve, etc.) or passively acquire (e.g., receive, etc.) an email message 130 specifying an external link identifier 132. In examples described herein, an "external link identifier" is information directly or indirectly mapped, by a linking service, to a particular machine-readable link associated with the linking service. In some examples, instructions 122 may acquire email message 130 from an email gateway of linking service 170, as described below in relation to FIG. 2.

In some examples, an external link identifier may be an identifier that is exposed outside of the linking service as a reference that may be utilized by users to identify the machine-readable in update requests sent to the linking service 170. For example, external link identifier 132 may be a dedicated email address 132 assigned to machine-readable link 142 in mapping repository 140. In such examples, the email address 132 may be included in email message 130 as the destination address of email message 130. In such examples, a user may request to update content to which machine-readable link 142 is assigned as a payoff by sending email message 130 to the dedicated email address 132 assigned to machine-readable link 142. In other examples, the external link identifier 132 may be any other suitable information (e.g., an alphanumeric string, etc.), and the email message 130 may be sent to a generic destination address for linking service 170.

In the example of FIG. 1, external link identifier 132 may be mapped to a machine-readable link 142 in a mapping repository 140 of linking service 170. In some examples, mapping repository 140 may comprise mappings between external link identifiers and internal link identifiers used within linking platform 160. Though external link identifier 132 is schematically illustrated in FIG. 1 as being mapped to machine-readable link 142 in mapping repository 140, in some examples this mapping may be implemented by having external link identifier 132 mapped to an internal link identifier for machine-readable link 142 (e.g., the internal link identifier for link 142 for linking platform 160). In some examples, mapping repository 140 may be implemented as at least one machine-readable storage medium, database, or the like, or a combination thereof. In the example of FIG. 1, mapping repository 140 is illustrated as separate from but accessible to computing device 100. In other examples, computing device 100 may comprise mapping repository 140. Although one mapping is illustrated in FIG. 1, in some examples, mapping repository 140 may comprise mappings between a plurality of external link identifiers and respective machine-readable links (and/for internal link identifiers).

Instructions 124 may identify the machine-readable link to which the acquired external link identifier is assigned in a mapping repository 140 of linking service 170. In the example of FIG. 1, instructions 124 may identify machine-readable link 142 as the link to which external link identifier 132 of email message 130 is assigned in mapping repository 140.

Based on email message 130 and the identification performed by instructions 124, instructions 126 may cause linking platform 160 to assign machine-readable link 142 to second content 152, different than first content 150, as the payoff for machine-readable link 142. For example, instructions 126 may provide a request 186 to linking platform 160 to request that linking platform 180 assign link 142 to second content 162. In response, linking platform 160 may update the payoff for link 142 such that link 142 is assigned to second content 152 as the payoff rather than first content 150. In the example of FIG. 1, linking platform 160 is illustrated as separate from but accessible to computing device 100. In other examples, linking platform 160 may be at least partially implemented by computing device 100.

As noted above, instructions 126 may cause linking platform 160 to assign machine-readable link 142 to second content 152, as the payoff for link 142, based on email message 130 and the identification performed by instructions 124. In such examples, Instructions 126 may determine, based on email message 130, what action to take in relation to the link associated with external link identifier 132. For example, email message 130 may include explicit instructions on what action to take based on message 130. For example, instructions 126 may determine that content of email message 130 includes action information comprising an indication to update, with second content 152, the payoff for the machine-readable link associated with external link identifier 132. In response to the determination, instructions 126 may cause linking platform 160 to assign machine-readable link 142 to second content 162 as the payoff for machine-readable link 142.

In some examples, the subject, body, or other portion of email message 130 may include the action information, which may comprise a predefined instruction indicating an "update" operation for linking service 170, for example. In some examples, the action information may also explicitly or implicitly identify the second content 152. For example, the action information may include second content 152 (e.g., a file, a URL, etc.), a reference to second content 152 indicating where content 152 may be obtained by linking platform 160 (e.g., an address), or an instruction useable to determine second content 152 (e.g., an indication to use the next content in a predefined list of content for link 142, an indication of how to alter the text of a URL to be content 152, etc.). In other examples, email message 130 may not include any explicit action information. In such examples, instructions 126 may take predetermined action(s) in response to email message 130, such as, in some examples, updating the payoff of link 142 to be second content 152, as described above.

In some examples, instructions 122, 124, and 126 may be part of an installation package that, when installed, may be executed by processing resource 110 to implement the functionalities described herein in relation to instructions 122, 124, and 126. In such examples, storage medium 120 may be a portable medium, such as a CD, DVD, or flash drive, or a memory maintained by a server from which the installation package can be downloaded and installed. In other examples, instructions 122, 124, and 126 may be part of an application, applications, or component already installed on remote printing server 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

Figure 2:
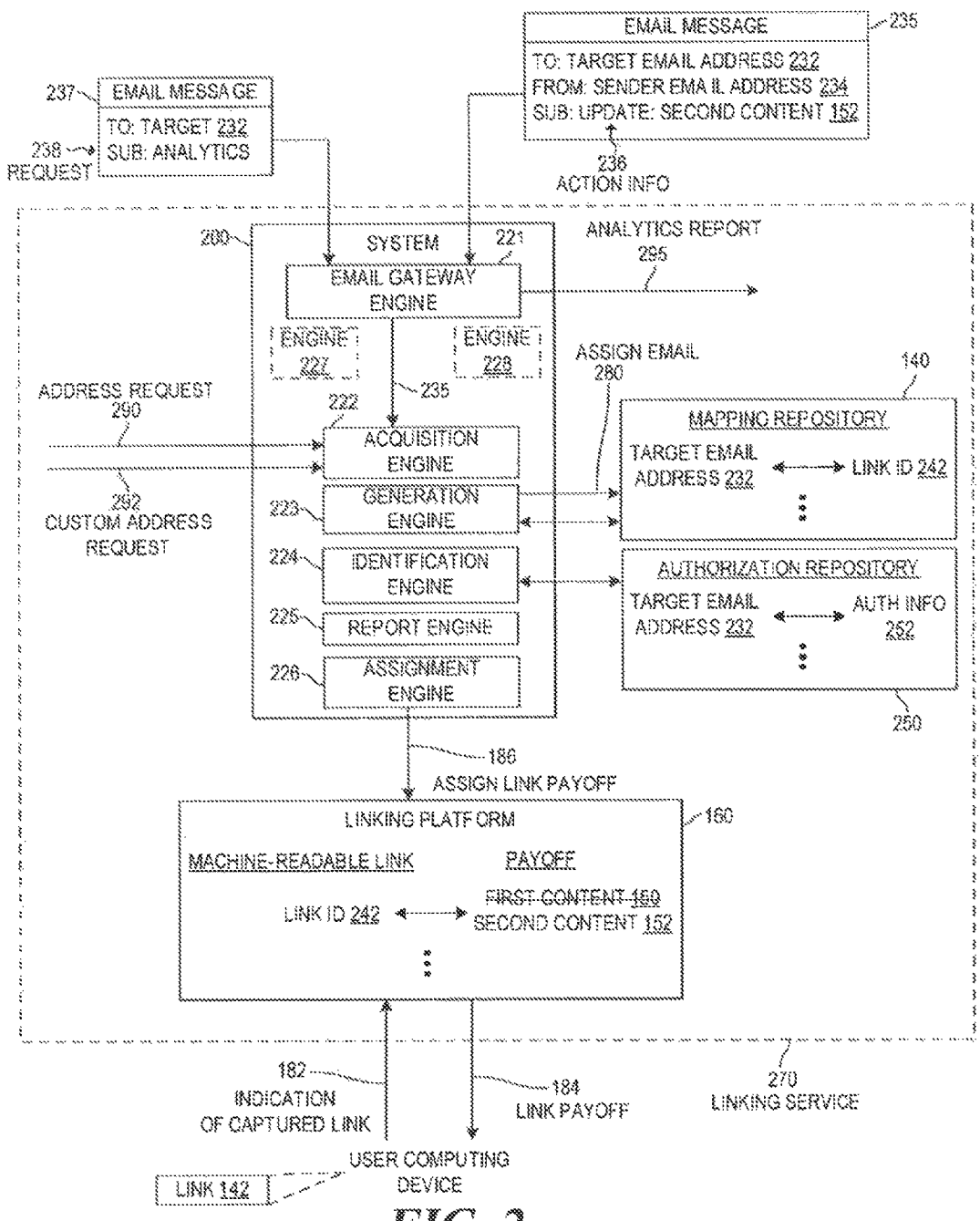
FIG. 2 is a block diagram of an example system to cause a linking platform to assign a machine-readable link to content as the payoff for the link.

FIG. 2 is a block diagram of an example system 200 to cause a linking 160 platform of a linking service 270 to assign a machine-readable link 142 to content as the payoff for the link 142. In the example of FIG. 2, linking service 270 may be implemented by one or more computing devices, and comprises system 200 and an authorization repository 250. Linking service 270 also comprises a mapping repository 140 and a linking platform 160, as described above in relation to FIG. 1.

In the example of FIG. 2, a machine-readable link 142 may initially be assigned to first content 150 as the payoff for machine-readable link 142 by linking platform 160, as described above in relation to FIG. 1. In the example of FIG. 2, linking platform 160 may implement the assignment of link 142 to first content 150 by assigning an internal link identifier 242 for machine-readable link 142 to first content 150. Although one assignment of a machine-readable link to content (a payoff) is illustrated in FIG. 2, in some examples, linking platform 160 may comprise assignments of a plurality of machine-readable links to respective content (payoffs).

As described above in relation to FIG. 1, a computing device remote from linking service 270 may capture an image of machine-readable link 142 and determine payload information for link 142. Also as described above, the computing device may provide an indication 182 that the computing device has captured an image of machine-readable link 142, as described above, and in response to indication 182, linking platform 160 may provide the computing device access to a payoff 184 for machine-readable link 142, which is initially first content 150 in the example of FIG. 2.

In the example of FIG. 2, system 200 includes at least engines 221-226, which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 221-226. In such examples, system 200 may include the machine-readable storage medium storing the instructions and the processing resource to execute the instructions, or the machine-readable storage medium may be separate but accessible to system 200 and the processing resource.

In some examples, the instructions can be part of an installation package that when installed, can be executed by the processing resource to implement at least engines 221-226. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 200 including the processing resource. In such examples, the machine-readable storage medium may include memory such as a hard drive, solid state drive, or the like. In other examples, the functionalities of any engines of system 200 may be implemented in the form of electronic circuitry.

In the example of FIG. 2, acquisition engine 222 may acquire a request 290 for an email address for machine-readable rink 142. In some examples, request 290 may be received in response to creation of link 142 via linking platform 160 and/or a developer portal for linking platform 160. In other examples, request 290 may be a request that is received independent of the creation of link 142. In response to request 290, generation engine 223 may create a target email address 232 such that target email address 232 is unique in linking service 270 (i.e., not currently mapped to any machine-readable link or internal link identifier), and may assign target email address 232 to internal link identifier 242 for link 142 in mapping repository 140 (e.g., via email assignment communication 280), to thereby assign target email address 232 to machine-readable link 142 in mapping repository 140.

In the example of FIG. 2, mapping repository 140 is illustrated as separate from but accessible to system 200. In other examples, system 200 may comprise mapping repository 140. Although one mapping is illustrated in FIG. 2 for repository 140, in some examples mapping repository 140 may comprise mappings between a plurality of external link identifiers and respective machine-readable links (and/or internal link identifiers).

In some examples, engine 223 may generate target email address 232 having an arbitrary alphanumeric local part (e.g., "123456"), and a domain part associated with linking service 270 (e.g., "linkingservice.com", to generate an example target email address of "1234567@linkingservice.com"). In some examples, email gateway engine 221 of system 200 may receive email sent to email addresses specifying a domain (e.g., "linkingservice.com" as one example) associated with linking service 270. The domain may be specified by the domain part of the email address.

In some examples, engine 222 may further receive a customization request 292 to change target email address 232 to a custom email address (e.g., "john@linkingservice.com") specified (e.g., included) in the request 292. In response to customization request 292, engine 223 may assign the custom email address to machine-readable link 142 (i.e., to internal link identifier 242) in mapping repository 140 when the specified custom email address is not already assigned to any machine-readable link in mapping repository 140. In examples described below, target email address 232 may be either the email address generated by system 200, or the specified custom email address.

Examples of updating content assigned to a machine-readable link are described below in relation to FIG. 2. In the example of FIG. 2, engine 221 may implement an email gateway that may receive email messages having, as destination addresses, email addresses specifying the domain associated with linking service 270, and may provide the received email messages to engine 222. For example, if a domain associated with linking service 270 is "linkingservice.com", then email gateway engine may receive emails having "linkingservice.com" as the domain part of the destination email address (i.e., the portion following the "@" symbol, as in "1234567@linkingservice.com"). Linking service 270 may be associated with one or more domains, and may receive email messages with destination email addresses specifying any of those domains. Although in the example of FIG. 2, email gateway engine 221 is illustrated as pert of system 200, in some examples, email gateway engine 221 may be separate from but accessible to system 200.

In the example of FIG. 2, acquisition engine 222 may (actively or passively) acquire an email message 235 from engine 221 including, as a destination address, target email address 232, which specifies a domain associated with a linking service (e.g., "linkingservice.com" in the above example). In other examples, email message 235 may have as a destination address a generic email address for linking service 270, and email message 235 may include an external link identifier other than an email address, as described above in relation to FIG. 1.

Identification engine 224 may identify the machine-readable link 142 (e.g., the internal link identifier 242 for link 142) to which target email address 232 is assigned in mapping repository 140. Based on email message 235 and the identification, assignment engine 226 may cause linking platform 160 to assign machine-readable link 142 (e.g., assign internal link identifier 242 for link 142) to second content 152 (different than first content 150 to which it was assigned initially), as the payoff for machine-readable link 142. For example, engine 226 may provide a request 186 to linking platform 160 to request that linking platform 160 assign link 142 (i.e., identifier 242) to second content 152, and in response, linking platform 160 may update the payoff for link 142 such that link 142 (I.e., internal link identifier 242) is assigned to second content 152 as the payoff rather than first content 150.

In some examples, engine 226 may determine, based on email message 235, what action to take in relation to the link associated with target email address 232, as described above in relation to the external link identifier of FIG. 1. For example, email message 235 may include second content 152 and action information 236 comprising an indication (e.g., a predefined instruction, such as "update,") to update, with second content 152, a payoff for a machine-readable link (e.g., the link specified by the target email address 232).

Based on action information 236, engine 226 may provide second content 152 to linking platform 160 and request that linking platform 160 assign machine-readable link 142 (e.g., identifier 242) to second content 152 as the payoff for machine-readable link 142. In some examples, action information 236 may be included in the subject, body, or any other portion of email message 235.

In other examples, email message 235 implicitly identify the second content 152, as described above in relation to FIG. 1. In some examples, email message 235 may not include any explicit action information. In such examples, engine 226 may take predetermined action(s) in response to email message 235, such as, in some examples, updating the payoff of link 142 to be second content 152, as described above in relation to FIG. 1. In the example of FIG. 2, linking platform 160 is illustrated as separate from but accessible to system 200. In other examples, linking platform 160 may be at least partially implemented by system 200.

In some examples, before assignment engine 226 causes linking platform 160 to assign machine-readable link 142 to second content 152 in response to email message 235, identification engine 224 may determine whether authorization information 252 for target email address 232 indicates that a sender of email message 235 is authorized to update machine-readable link 235. In such examples, engine 226 may cause linking platform 180 to assign machine-readable link 142 to second content 152 in response to a determination that sender is authorized.

For example, authorization repository 260 may include authorization information for one or more target email addresses 232 (or external link identifiers in other examples). The authorization information may indicate whether a given sender is authorized or not to update, access, etc., a given machine-readable link, or information associated with the link. In the example of FIG. 2, authorization information 252 for target email address 232 may comprise a list (e.g., a whitelist) of sender email addresses authorized to update or otherwise access link 142 (or information for link 142) via an email to target email address 232. In the example of FIG. 2, based on receipt of email message 235 by acquisition engine 222, engine 224 may access authorization repository 250 to determine whether the authorization information 252 includes sender email address 234 (i.e., the sender of email message 235). If so, then engine 224 may determine that the sender is authorized to update or otherwise access link 142 via target email address 232 and, in response to the determination by engine 224, assignment engine 226 may cause linking platform 160 to assign machine-readable link 142 to second content 152. If authorization information 252 does not include sender email address 234, then engine 224 may determine that the sender is not authorized to update or otherwise access link 142 via target email address 232 and, in response to the determination by engine 224, assignment engine 226 may prevent engine 226 from causing any change or other access to link 142 based on email message 235.

In other examples, authorization information 252 for target email address 232 may comprise a list (e.g., a blacklist) of sender email addresses not authorized to update or otherwise access link 142 (or information for link 142) via an email to target email address 232. In such examples, engine 226 may prevent updating or accessing link 142 if the sender email address 234 is in authorization information 252 (as determined by engine 224), and may permit engine 226 to update, access, etc., link 142 if the sender email address 234 is not in authorization information 252 (as determined by engine 224).

In some examples, authorization repository 250 may be implemented as at least one machine-readable storage medium, database, or the like, or a combination thereof. In the example of FIG. 2, authorization repository 250 is illustrated as separate from but accessible to system 200. In other examples, system 200 may comprise authorization repository 250. Although one mapping is illustrated in FIG. 2, in some examples, authorization repository 250 may comprise mappings between a plurality of target email addresses (or other external link identifiers) and authorization information for each.

In some examples, acquisition engine 222 may actively or passively acquire (from email gateway engine 221) another email message 237 including target email address 232 as the destination address and including a request 238 for analytics information (e.g., in the subject, body, or other portion of the email message 237). In such examples, report engine 225 may, based on target email address 232 and request 238, output an analytics report 2965 including analytics information regarding captures of machine-readable link 142 to which target email address 232 is assigned in mapping repository 140. In some examples, the analytics information may be output via email gateway engine 221 as an email to the sender of email message 237. The analytics information may include, for example, scan trends, statistics, location information, user-classification information, browser information, computing device information, or the like, or a combination thereof, for captures of link 142. In some examples, report engine 225 may define a plurality of analytics reports that may be returned in response to corresponding requests in small messages to target email addresses (such as address 232).

In some examples, system 200 may further include a short message service (SMS) gateway engine 227 to receive SMS messages (e.g., text messages) specifying respective external link identifiers. In such examples, in response to such an SMS message, system 200 may update the respective machine-readable link associated with the specified external link identifier as described above in relation to email messages. Engine 227 may be any combination of hardware and programming, as described above, to implement the functionalities described herein in relation to engine 227. Although engine 227 is illustrated as part of system 200, in other examples engine 227 may be separate from by accessible to system 200.

For example, acquisition engine 222 may actively or passively acquire (from the SMS gateway 227) an SMS message specifying an external link identifier, and identification engine 224 may identify a machine-readable link to which the external link identifier is assigned in mapping repository 140 of linking service 270. In such examples, the machine-readable link may be assigned to third content as the payoff, and based on the SMS message and the identification (and implicit or explicit action information), assignment engine 226 may cause linking platform 160 to assign the machine-readable link to fourth content as the payoff for the machine-readable link. In some examples, each of the SMS messages may be sent to a dedicated SMS number for the linking service 270 and may include the external link identifier.

Additionally or alternatively, system 200 may include a telephony gateway engine 228 to receive telephone calls specifying respective external link identifiers. In such examples, based on such a telephone call, system 200 may update the respective machine-readable link associated with the specified external link identifier as described above in relation to email messages. Engine 228 may be any combination of hardware and programming, as described above, to implement the functionalities described herein in relation to engine 228. Although engine 228 is illustrated as part of system 200, in other examples engine 228 may be separate from by accessible to system 200.

For example, acquisition engine 222 may receive (from the telephony gateway engine 228) telephone call information specifying an external link identifier (e.g., via voice or touch-tone commands), and identification engine 224 may identify a machine-readable link to which the external link identifier is assigned in mapping repository 140 of linking service 270. In such examples, the machine-readable link may be assigned to third content as the payoff, and based on the telephone call and the identification (and implicit or explicit action information), assignment engine 226 may cause linking platform 160 to assign the machine-readable link to fourth content as the payoff for the machine-readable link. In some examples, functionalities described herein in relation to FIG. 2 may be provided in combination with functionalities described herein in relation to any of FIGS. 1 and 3-4.

Figure 3:
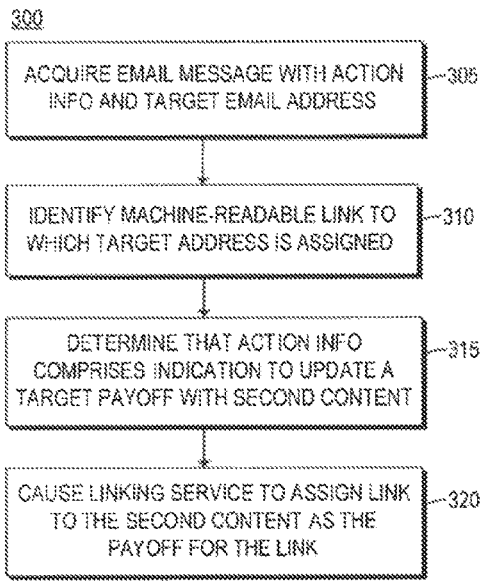
FIG. 3 is a flowchart of an example method for causing a linking service to assign a machine-readable link to content as a payoff for the link.

FIG. 3 is a flowchart of an example method 300 for causing a linking service to assign a machine-readable link to content as a payoff for the link. Although execution of method 300 is described below with reference to system 200 of FIG. 2 described above, other suitable systems for the execution of method 300 can be utilized (e.g., computing device 100). Additionally, implementation of method 300 is not limited to such examples.

At 305 of method 300, engine 222 of system 200 may acquire an email message 235 including action information 236 and a target email address 232 as a destination address. At 310, engine 224 may identify a machine-readable link 142 (e.g., identify an internal link identifier 242 for link 142) to which target email address 232 is assigned in mapping repository 140 of linking service 270. In some examples, linking service 270 may provide a computing device access to a payoff for machine-readable link 142 in response to an indication 182 that the computing device has captured an image of machine-readable link 142, as described above. Also, in some examples, machine-readable link 142 may be initially assigned to first content 150 as the payoff for machine-readable link 142 in linking service 270.

At 315, engine 224 may determine that action information 236 comprises an indication to update, with second content 152, a target payoff (i.e., the payoff for the machine-readable link 142 associated with target email address 232). At 320, based on the identification and the determination, engine 228 may cause linking service 270 (e.g., a linking platform 160 of linking service 270) to assign machine-readable link 142 to the specified second content 152 as the payoff for identified machine-readable link 142, wherein the first content 150 and the second content 152 are different.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
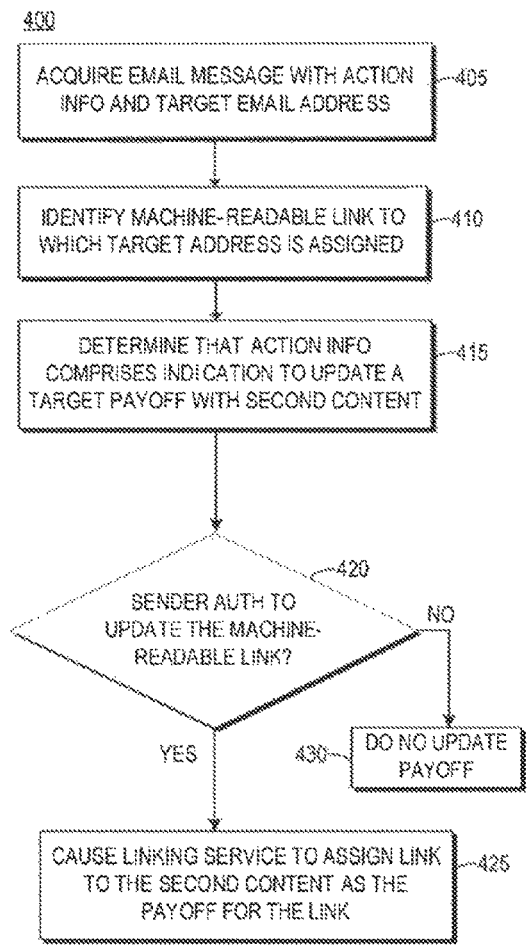
FIG. 4 is a flowchart of an example method for determining whether authorization information for a target email address indicates that a sender is authorized to update a machine-readable link.

FIG. 4 is a flowchart of an example method 400 for determining whether authorization information for a target email address indicates that a sender is authorized to update a machine-readable link. Although execution of method 400 is described below with reference to system 200 of FIG. 2 described above, other suitable systems for the execution of method 400 can be utilized (e.g., computing device 100). Additionally, implementation of method 400 is not limited to such examples. Method 400 is described below with reference to example of FIG. 2.

At 405 of method 400, engine 222 of system 200 may acquire an email message 235 including action information 238 and a target email address 232 as a destination address. At 410, engine 224 may identify a machine-readable link 142 (e.g., identify an internal link identifier 242 for link 142) to which target email address 232 is assigned in mapping repository 140 of linking service 270. In some examples, linking service 270 may provide a computing device access to a payoff for machine-readable link 142 in response to an indication 182 that the computing device has captured an image of machine-readable link 142, as described above. Also, in some examples, machine-readable link 142 may be assigned to first content 150 as the payoff for machine-readable link 142 in linking service 270.

At 415, engine 224 may determine that action information 236 comprises an indication to update, with second content 152, a target payoff (i.e., the payoff for the machine-readable link 142 associated with target email address 232). At 420, engine 224 may determine whether authorization information 252 (of authorization repository 250) for target email address 232 indicates that a sender of email message 235 (e.g., sender email address 234) is authorized to update machine-readable link 142. If so, then in response to the determination that the sender is authorized, method 400 may proceed to 425 where, based on the identification and the determination, engine 226 may cause linking service 270 to assign machine-readable link 142 to the specified second content 152 as the payoff for identified machine-readable link 142, wherein the first content 150 and the second content 152 are different. If not, then method 400 may proceed to 430, where engine 224 may prevent engine 226 from updating the payoff of link 142. In some examples, authorization information 252 may be a whitelist or a blacklist, as described above in relation to FIG. 2.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A non-transitory machine-readable storage medium comprising instructions executable by a processing resource of a linking service to:

acquire an email message specifying an external link identifier;

identify a machine-readable link to which the acquired external link identifier is assigned in a mapping repository of the linking service, wherein a linking platform of the linking service is to provide a computing device access to a payoff for the machine-readable link in response to an indication that the computing device has captured an image of the machine-readable link;

wherein the machine-readable link is assigned to first content as the payoff for the machine-readable link; and based on the email message and the identification, cause the linking platform to assign the machine-readable link to second content, different than the first content, as the payoff for the machine-readable link.

2. The storage medium of claim 1, wherein the external link identifier is an email address assigned to the machine-readable link in the mapping repository, and included in the email message as the destination address of the email message.

3. The storage medium of claim 1, wherein the instructions to cause comprise instructions executable by the processing resource to:

determine that content of the email message includes action information comprising an indication to update the payoff for the machine-readable link with the second content; and cause the linking platform to assign the machine-readable link to the second content as the payoff for the machine-readable link in response to the determination.

4. The storage medium of claim 1, wherein:

the machine readable link comprises at least one of a bar code, a digital watermark, and a target image; and the second content comprises one of a uniform resource identifier (URI) and a video.

5. A system comprising:

an acquisition engine to acquire an email message including, as a destination address, a target email address specifying a domain associated with a linking service;

an identification engine to identify a machine-readable link to which the target email address is assigned in a mapping repository of a linking service, wherein a linking platform of the linking service is to provide a computing device access to a payoff for the machine-readable link in response to an indication that the computing device has captured an image of the machine-readable link;

wherein the machine-readable link is assigned to first content as the payoff for the machine-readable link; and an assignment engine to, based on the email message and the identification, cause the linking platform to assign the machine-readable link to second content, different than the first content, as the payoff for the machine-readable link.

6. The system of claim 5, wherein the acquisition engine is to acquire a request for an email address for the machine-readable link, and the system further comprising:

a generation engine to, in response to the request, create the target email address such that the target email address is unique in the linking service;

wherein the generation engine is further to assign the target email address to the machine-readable link in the mapping repository.

7. The system of claim 6, wherein:

the acquisition engine is to receive a customization request to change the target email address to a custom email address specified in the request; and the generation engine is to, in response to the customization request, assign the custom email address to the machine-readable link in the mapping repository when the custom email address is not already assigned to any machine-readable link in the mapping repository.

8. The system of claim 6, wherein the generation engine is to assign the target email address to the machine-readable link in the mapping repository by mapping the target email address to an internal link identifier in the mapping repository, the internal link identifier utilized by a linking platform of the linking system to identify the machine-readable link.

9. The system of claim 8, wherein:

the email message includes the second content and action information comprising an indication to update the payoff for the machine-readable link with the second content; and based on the indication, the assignment engine is to provide the second content to the linking platform and request that the linking platform assign the machine-readable link to the second content as the payoff for the machine-readable link.

10. The system of claim 5, further comprising:

an email gateway engine to receive email messages having, as destination addresses, email addresses specifying the domain associated with the linking service and provide the received email messages to the acquisition engine.

11. The system of claim 5, wherein:

the acquisition engine is to acquire another email message including the target email address as the destination address and a request for analytics information;

a report engine to, based on the target email address and the request, output a report including analytics information regarding captures of the machine-readable link to which the target email address is assigned in the mapping repository.

12. The system of claim 5, wherein:

the acquisition engine is further to acquire a short message service (SMS) message specifying an external link identifier;

the identification engine to identify another machine-readable link to which the external link identifier is assigned in the mapping repository of the linking service, wherein the another machine-readable link is assigned to third content as the payoff for the another machine-readable link; and the assignment engine is to, based on the SMS message and the identification, cause the linking platform to assign the another machine-readable link to fourth content as the payoff for the machine-readable link.

13. The system of claim 5, further comprising:

the acquisition engine is further to receive, from a telephony gateway engine, a request specifying an external link identifier;

the identification engine to identify another machine-readable link to which the external link identifier is assigned in the mapping repository of the linking service, wherein the another machine-readable link is assigned to third content as the payoff for the another machine-readable link; and the assignment engine is to, based on the request and the identification, cause the linking service to assign the another machine-readable link to fourth content as the payoff for the machine-readable link.

14. A method comprising:

acquiring an email message including action information and a target email address as a destination address;

identifying a machine-readable link to which the target email address is assigned in a mapping repository of a linking service, wherein the linking service is to provide a computing device access to a payoff for the machine-readable link in response to an indication that the computing device has captured an image of the machine-readable link;

wherein the machine-readable link is assigned to first content as the payoff for the machine-readable link in the linking service;

determining that the action information comprises an indication to update a target payoff with second content; and based on the identification and the determination, causing the linking service to assign the machine-readable link to the specified second content as the payoff for the identified machine-readable link, wherein the first and second content are different.

15. The method of claim 14, further comprising:

determining whether authorization information for the target email address indicates that a sender of the email message is authorized to update the machine-readable link;

wherein the causing the linking service to assign the machine-readable link to the specified second content as the payoff for the identified machine-readable link in response to a determination that the sender is authorized.

\* \* \* \* \*

UNITED STATES PATENT AND TRADEMARK OFFICE
CERTIFICATE OF CORRECTION

PATENT NO. : 10,068,065 B2  
APPLICATION NO. : 15/122334  
DATED : September 4, 2018  
INVENTOR(S) : Sandeep Matti Prabhu Page 1 of 1

It is certified that error appears in the above-identified patent and that said Letters Patent is hereby corrected as shown below:

On the Title Page

Item [71], after "Houston, TX (US);" delete "Sandeep Matti Prabhu, Bangalore (IN)".

In the Drawings

Drawing sheet 3 of 3, FIG. 4, reference numeral 430, Line 1, delete "NO" and insert -- NOT --, therefor.

In the Claims

Column 13, Line 23 Claim 4, delete "machine readable" and insert -- machine-readable --, therefor.

Signed and Sealed this  
Third Day of December, 2019

Andrei Iancu  
*Director of the United States Patent and Trademark Office*